(12) United States Patent
Brandstätter

(10) Patent No.: US 6,950,849 B1
(45) Date of Patent: Sep. 27, 2005

(54) CONTROLLING LOAD-BALANCED ACCESS BY USER COMPUTERS TO SERVER COMPUTERS IN A COMPUTER NETWORK

(75) Inventor: Klaus Brandstätter, Rosstal (DE)

(73) Assignee: HOB GmbH & Co. KG, Cadolzburg (DE)

( * ) Notice: Subject to any disclaimer, the term of this patent is extended or adjusted under 35 U.S.C. 154(b) by 888 days.

(21) Appl. No.: 09/702,666

(22) Filed: Nov. 1, 2000

(51) Int. Cl.[7] ............................................. G06F 15/16
(52) U.S. Cl. ...................... 709/203; 709/217; 709/218; 709/219; 709/227; 709/228; 709/229; 709/238
(58) Field of Search ................................. 709/203, 217, 709/218, 219, 227, 228, 229, 238

(56) References Cited

U.S. PATENT DOCUMENTS

| | | | |
|---|---|---|---|
| 6,078,960 A * | 6/2000 | Ballard ........................ | 709/229 |
| 6,128,279 A * | 10/2000 | O'Neil et al. ................ | 370/229 |
| 6,327,622 B1 * | 12/2001 | Jindal et al. ................ | 709/228 |
| 6,377,975 B1 * | 4/2002 | Florman ...................... | 709/203 |
| 6,381,748 B1 * | 4/2002 | Lin et al. .................... | 725/109 |
| 6,389,448 B1 * | 5/2002 | Primak et al. .............. | 718/105 |
| 6,438,652 B1 * | 8/2002 | Jordan et al. ............... | 711/120 |
| 6,473,791 B1 * | 10/2002 | Al-Ghosein et al. ........ | 709/217 |
| 6,658,479 B1 * | 12/2003 | Zaumen et al. ............. | 709/238 |
| 6,665,702 B1 * | 12/2003 | Zisapel et al. .............. | 718/105 |

OTHER PUBLICATIONS

Yoshikawa et al. , "Using Smart Clients to Build scalable Services", Abstract- 1997 Annual Technical Conference.*

* cited by examiner

Primary Examiner—Nabil El-Hady
(74) Attorney, Agent, or Firm—Browdy and Neimark PLLC

(57) ABSTRACT

An operating method on the basis of a data processing program is designed to control load-balanced access by a user computer to a server computer in a computer network. The load-balanced access takes place based on an inquiry by the user computer to all server computers regarding their load, and according to an assignment to the server computer with the lowest load.

6 Claims, 7 Drawing Sheets

CONTROLLING LOAD-BALANCED ACCESS BY USER COMPUTERS TO SERVER COMPUTERS IN A COMPUTER NETWORK

BACKGROUND OF THE INVENTION

1. Field of the Invention

The present invention relates to a data processing program based operating method for computer networks for controlling load-balanced access by a user computer to a server computer in a computer network with multiple user and server computers.

2. Background Art

A general problem with computer networks that incorporate multiple user and server computers consists of assigning to the individual user computers in the most optimized manner a server computer that has sufficient capacities, i.e., the lowest possible load. In the state of the art, this problem has, until now, essentially been solved in such a way that one of the servers registers the calls coming from the network of user computers for programs installed on all servers, and performs an allocation between a certain server computer and the user computer. The criterion for these allocations is the desire to balance the load of all connected server computers as evenly as possible.

However, the server computer that has been given prominence in the hierarchy over the remaining server computers, which assumes the access control and is commonly referred to as the load-balancing server, has the problem that load-balanced access by the individual user computers to certain server computers is no longer possible if this computer fails.

SUMMARY OF THE INVENTION

Against the background of the described problem, the invention is based on the aim of revealing an operating method for computer networks that ensures load-balanced access by a user computer to one of multiple server computers without the need for a privileged load-balancing server.

This aim is met by an operating method comprising the following steps:

- all server computers continually determine a load on their central processing unit—CPU load—and store at least one load-specific data value in a configuration that can be called up over the computer network,
- all server computers wait for datagrams stemming from user computers in the network, which incorporate a header to call up load-specific data values,
- a user computer seeking access to the server computer with the lowest CPU load sends a datagram over the network to the server computers, with a header to call up the CPU load,
- the server computers each send back a reply datagram over the network to the user computer with the load-specific data value,
- the user computer analyzes the datagrams to determine which server computer has the lowest CPU load, and access is initiated to the server with the lowest CPU load.

Recognizably, access is thus equal to all server computers and each of them determines its own load. Information regarding this load is processed by a user computer seeking access, after which the user computer itself selects "its" server computer with the lowest load.

Recognizably, there is no longer a load-balancing server, the failure of which could impede the load-balanced access. The optimally balanced load of the server computers that are connected to the network is thus ensured in a significantly more fail-safe manner.

Preferred embodiments of the inventive operating method, the specific characteristics and advantages of which will become apparent from the following description, in which the invention is explained in greater detail based on the appended drawings.

DESCRIPTION OF THE PREFERRED EMBODIMENTS

An operating method according to the invention is implemented on the various computers in the computer network 1 shown in FIGS. 1 through 7 on the basis of a corresponding data processing program. The program is installed, in the usual manner, with its corresponding program components on the user computers U1 through U5 on one hand, and on the server computers S1–S5 on the other hand. It is commonly started on the server as a service. Alternately, it may also be started from the "command prompt", from the console. When the program is called up, the number of a UDP (=USER DATAGRAM PROTOCOL) port may be transmitted. If no port number is transmitted, a default port, e.g., default port 4095, is used. Based on the program, all server computers now continually determine the load on their central processing units. This CPU load is determined on the basis of the amount of time that has elapsed since the last time the respective central processing unit was called, and a corresponding load-specific data value is determined. When multiple central processing units exist in a server computer, the average of all active processors is formed. The inventive program then stores these determined values in a defined number of 20 entries of elapsed amounts of time in a table, from which a data value is determined that is specific for the CPU load.

In this condition all server computers S1 through S5 wait for datagrams arriving from the user computers U1 through U5, while the load-specific data value is continually updated.

If access is now to take place by a user computer U3 from the total number of user computers U1 through U5 to initiate a program session on the server computer S1 through S5 with the lowest load, a circular datagram is transmitted by the user computer U3 to all server computers S1 through S5 in the network 1. The datagram contains a header identifying the datagram as an instruction to call up the CPU load of the respective server computer S1 through S5 over the network 1. Instead of a circular datagram, individual datagrams may also be sent to predefined server computers S1 through S5, which can be implemented based on the program configuration. The circular datagram is symbolized in FIG. 1 by the arrows 2.

Figure 1:
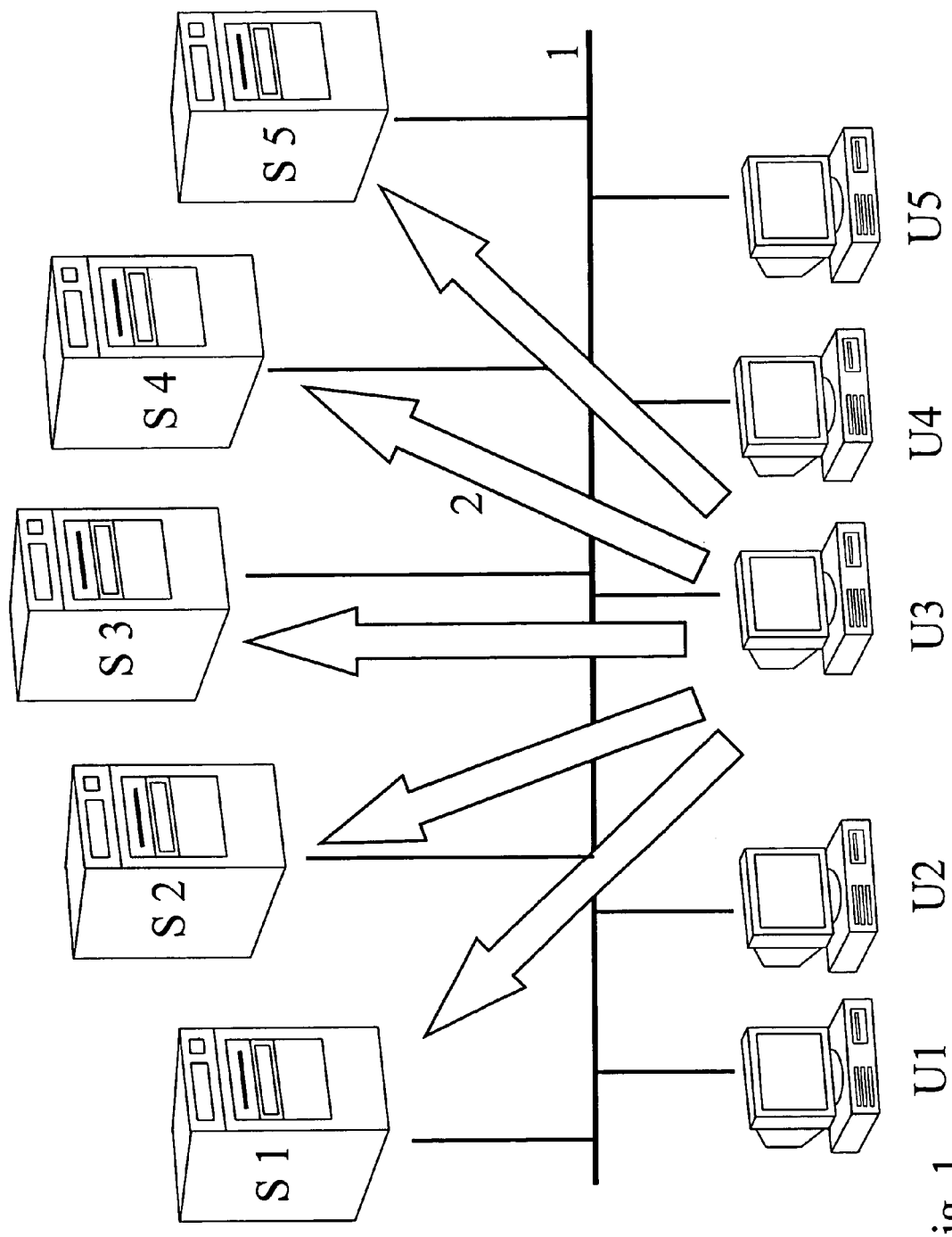
FIGS. 1 through 3 show schematic diagrams for a method of controlling the access of a user computer to a server computer in a computer network in successive phases.
Figure 2:
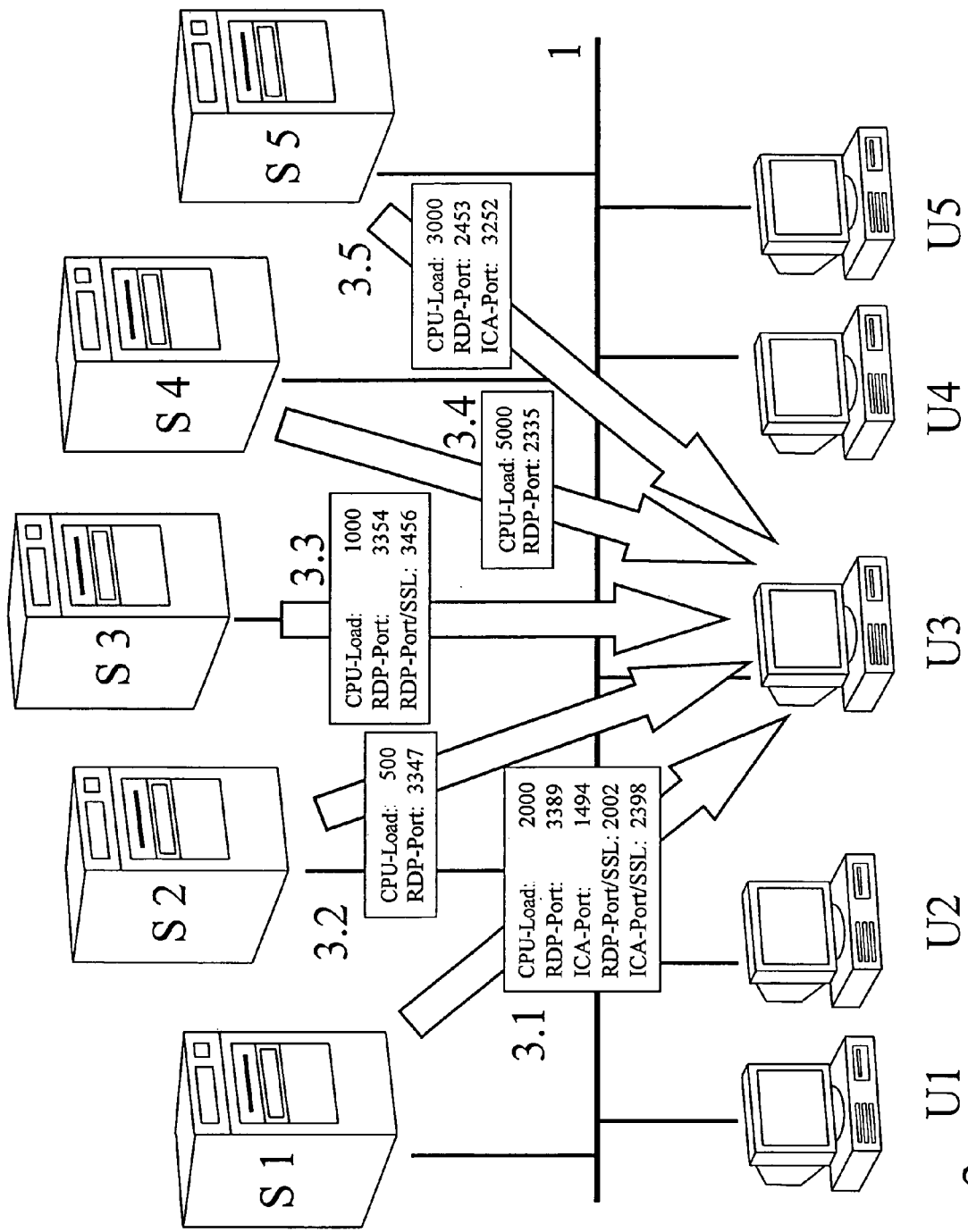
Figure 3:
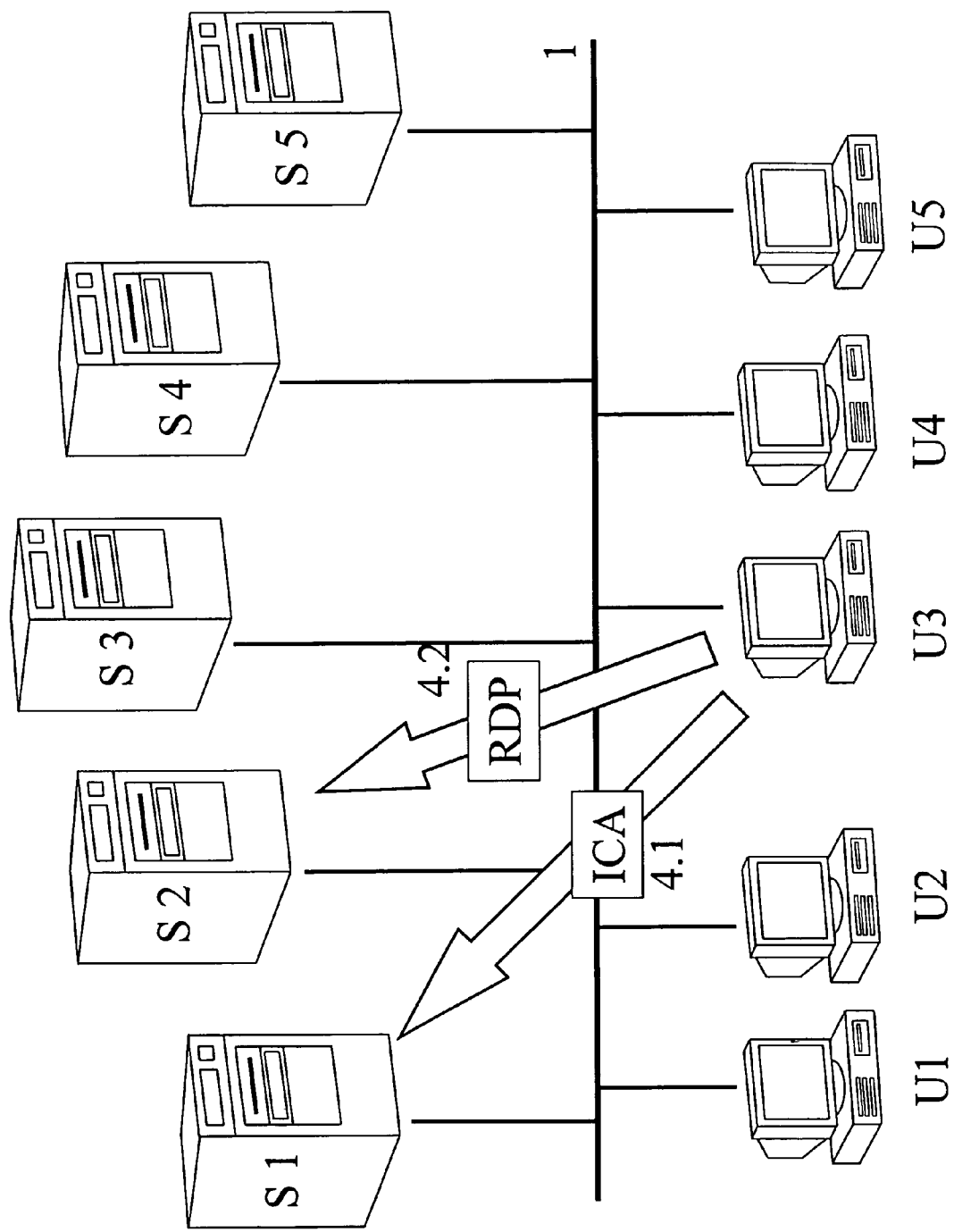
Figure 4:
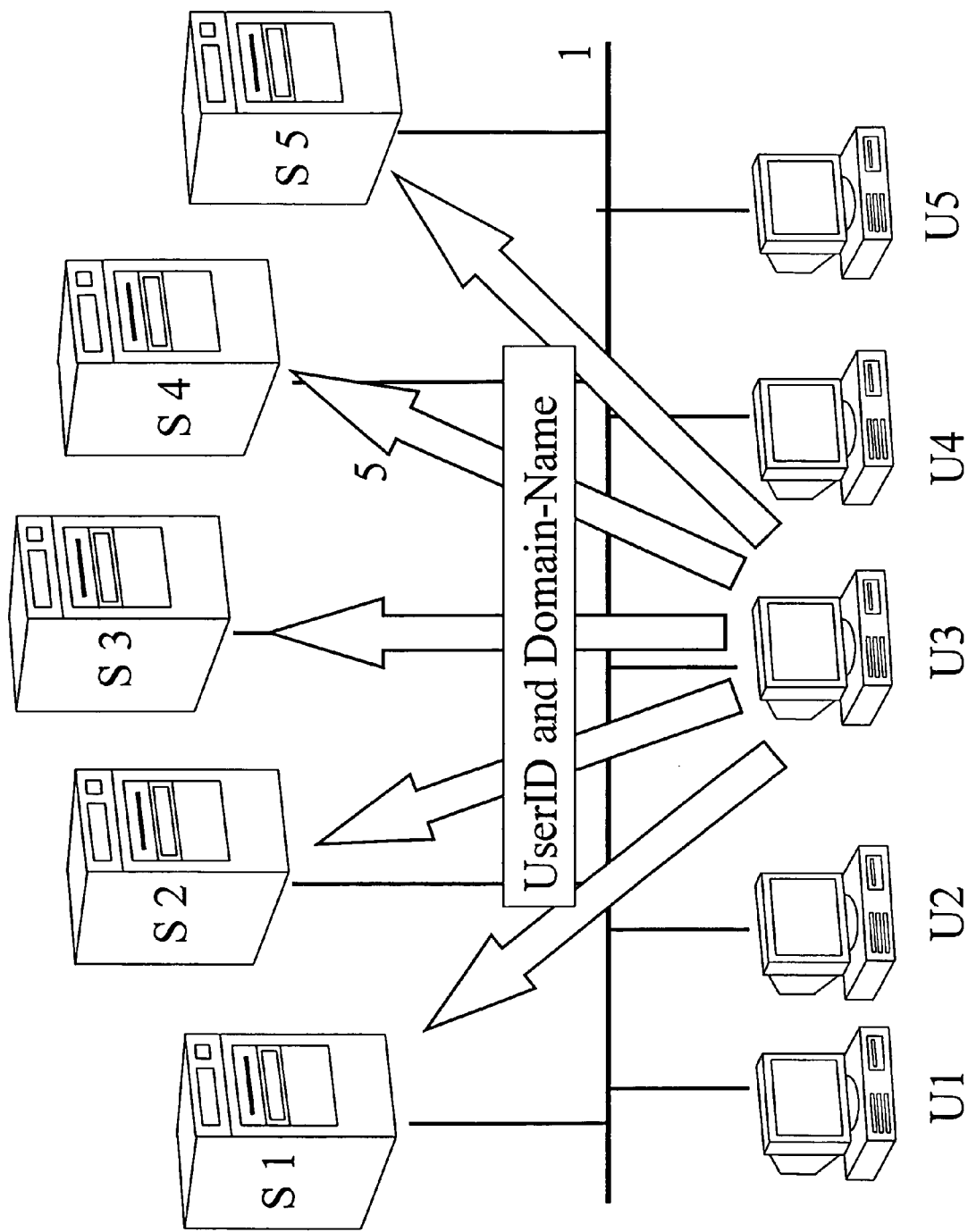
FIGS. 4 through 7 show corresponding diagrams for an alternate operating method.
Figure 5:
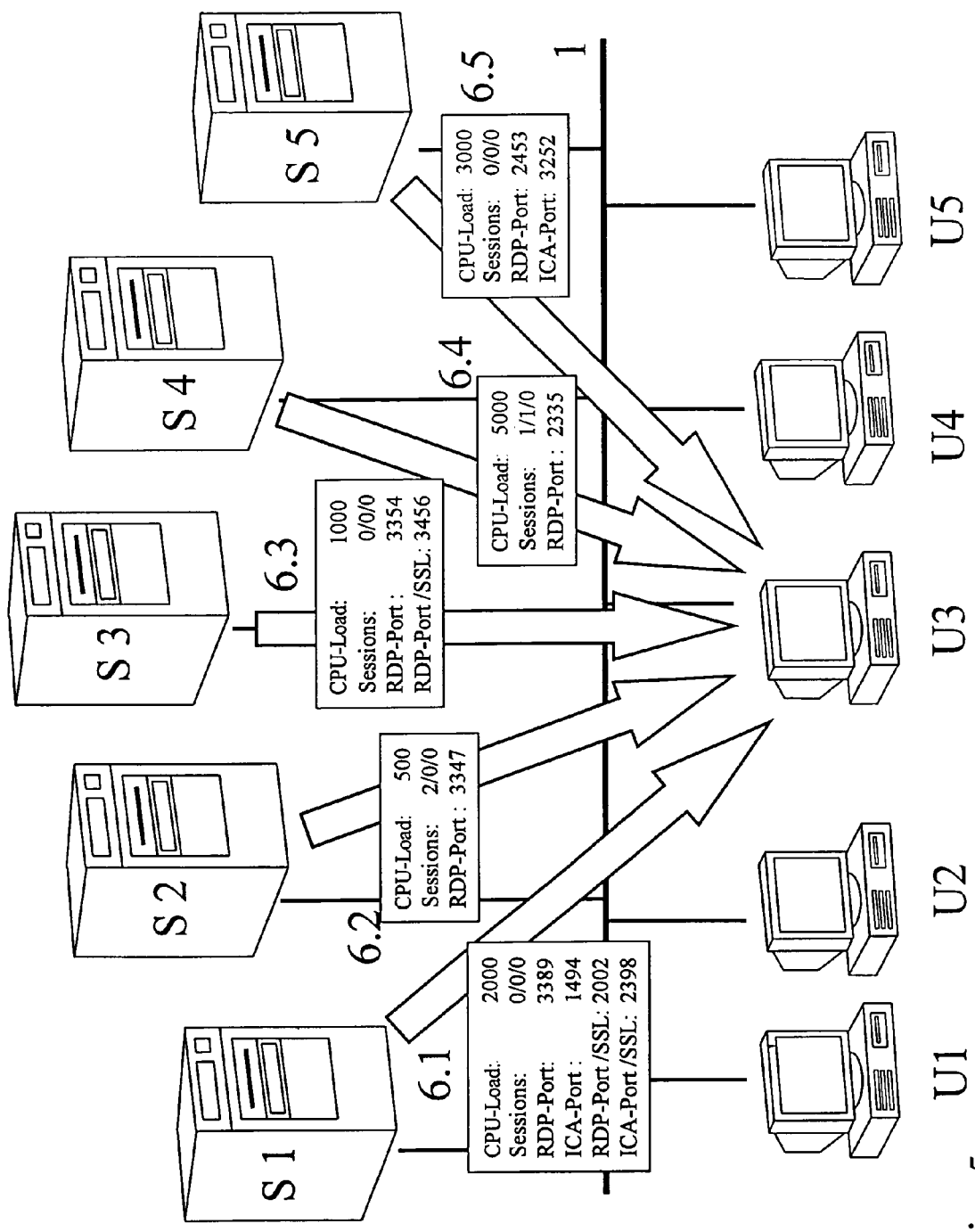

Based on the circular datagram 2, all server computers S1 through S5 return reply datagrams 3.1 through 3.5 (see arrows in FIG. 2), in which a load-specific data value is transmitted over the network 1 to the user computer 3 via the UDP port 4095. This data value may be standardized to a range of 0 to 10,000, for example, with the value 10,000 corresponding to a 100% load. The reply datagrams 3.1 to 3.5 from the individual server computers S1 through S5 contain additional information regarding available connection ports, by which an exchange of data can take place between the user computer U3 and the respective server computer S1 through S5 according to the defined data exchange protocols. For example, the data exchange protocol RDP is available at all server computers S1 through S5. The server computers S1 and S5 additionally offer the ICA protocol. Lastly, data encryption is implemented on the server computers S1 through S3. The information relating to this is contained in the reply datagrams 3.1 through 3.5, as indicated in FIG. 2.

The user computer U3 now analyzes the datagrams 3.1 through 3.5 to determine which server computer has the lowest load under certain framework conditions, such as the desired data exchange protocol. If, for example, a connection is to be made via ICA, as a matter of principle only the server computers S1 and S5 are suitable. Of these two, the server computer S1 has a lower load with a CPU load of 2000, compared to the server computer S5 with a CPU load of 3000. The inventive operating method will, therefore, establish a connection between the user computer U3 and the server computer S1, as indicated at 4.1 in FIG. 3.

However, if a connection between computers is to be made via the RDP protocol, all server computers are available. Accordingly, the server computer S2 will be selected for the connection 4.2 since, with a CPU load of 500, it has the lowest load of all server computers S1 through S5.

To summarize, access will be initiated via the inventive access method to the server computer S1 or S2 that has the lowest CPU load while providing the desired data exchange protocol.

An alternate implementation of the inventive access method is symbolized in FIGS. 4 through 7. To avoid unnecessary explanations, only the differences from the above-described method will be pointed out in this context. A circular datagram 5 is transmitted to the server computers S1 through S5 over the computer network 1 from the user computer U1 seeking access to the server computer with the lowest load, which, in addition to the abovementioned header to call up the CPU load, also contains identification parameters representative for this computer, namely a user identification number "userID" and, optionally, also an associated domain name. If the received datagram 5 contains a userID, a determination is made with the aid of a corresponding API (application programming interface) in the server computer S1 through S5, whether program sessions with this user identification number are currently running. If a domain name is transmitted in addition to the user identification number, an additional check is performed when the user identification number matches, to determine whether the domain name matches.

On the server computers S1 through S5 it is now registered, in the usual manner, which program sessions are currently running in which condition. Distinctions are made, in this context, between the conditions "disconnected", "connected and active" and "other". The latter condition has no specific program-related definition.

If a circular datagram 5 with user ID and domain name is now transmitted, the server computers each send reply datagrams 6.1 through 6.5 which contain, in addition to the load-specific data value for the CPU load and the available transfer protocols, also a listing of the number of program sessions currently running for this user ID and domain name. For example, no program sessions of the user computer U1 are running on the server computers S1, S3, S5, which is manifested by the information "Sessions: 0/0/0".

On the server computer S2, two program sessions are disconnected and none are active, which is illustrated by the information "Sessions:2/0/0". The server computer S4 reports "Sessions: 1/1/0", which means one disconnected and one connected, active program session.

Figure 6:
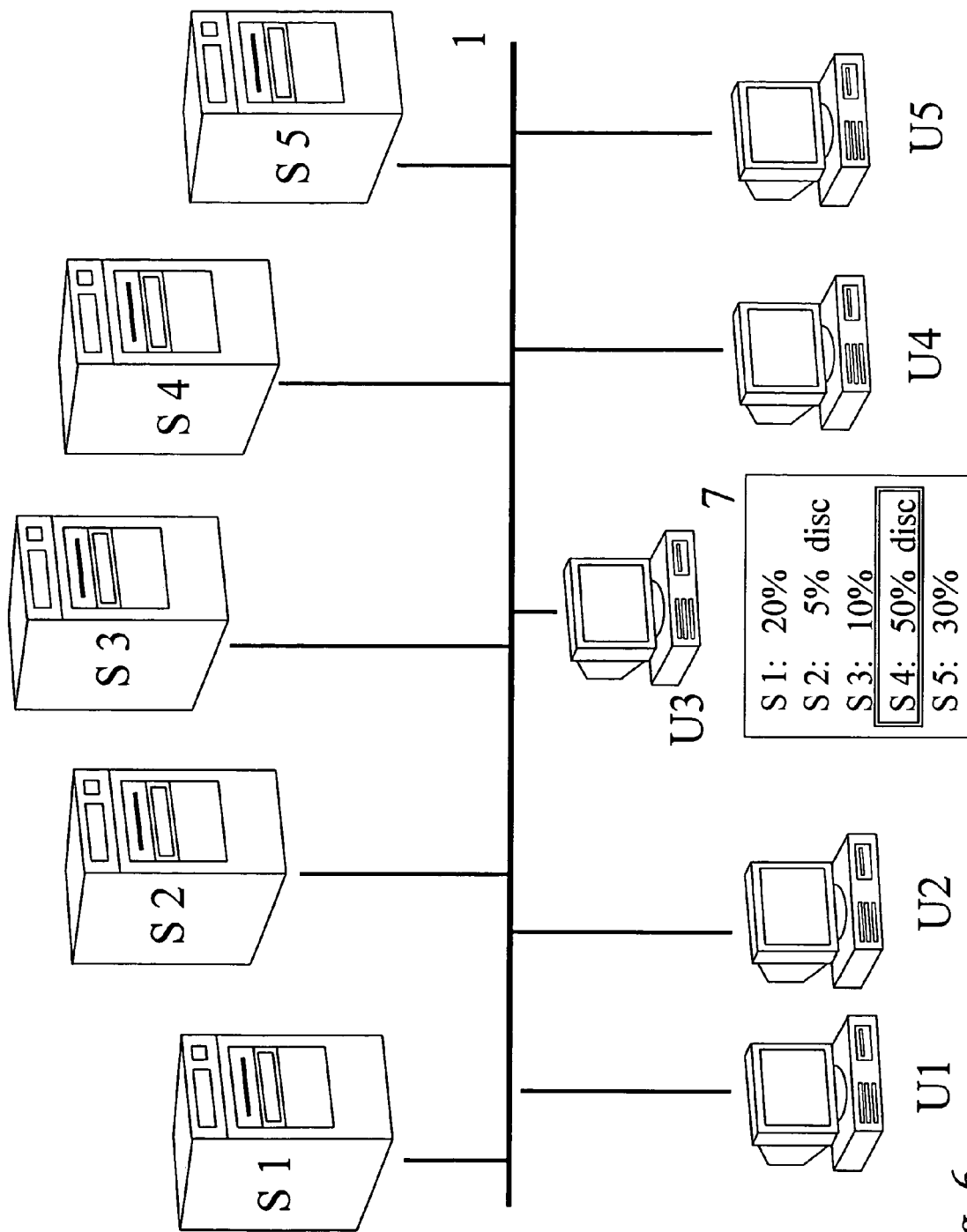
Figure 7:
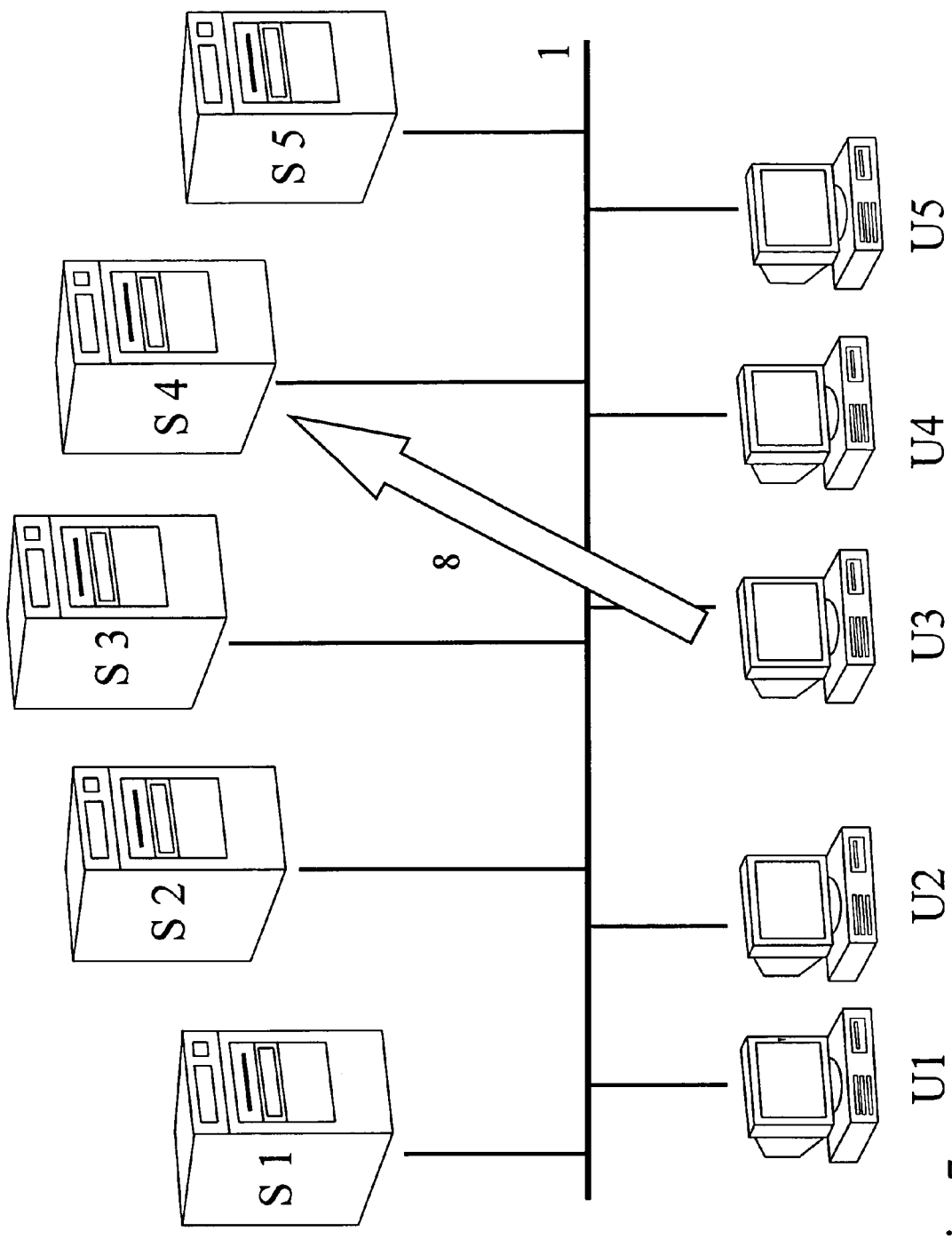

The user computer U3 now analyzes the incoming reply datagrams 6.1 through 6.5 in such a way that it registers the respective CPU loads and the fact whether a disconnected program session exists on a server computer. In FIG. 6 this has been indicated by the table 7. In the process, the determination is made that a disconnected program session exists on the server computer S4 with the highest load of 50% of all server computers S1 through S5. The user computer U3 accordingly re-establishes this disconnected RDP program session with a corresponding connection 8 to the server computer S4 (see FIG. 7).

What is claimed is:

1. A data processing program based operating method for computer networks to control load-balanced access by a user computer to a server computer in a computer network with multiple user and server computers having the following method steps:

all server computers (S1–S5) continually determine the load of their central processing unit—CPU load—and store at least one load-specific data value in a configuration that can be called up over the computer network (1), all server computers (S1–S5) wait for datagrams (2, 5) stemming from user computers (U1–U5) in the computer network (1), which incorporate a header to call up load-specific data values, a user computer (U3) seeking access to the server computer (S1–S5) with a lowest CPU load sends a datagram (2, 5) over the computer network (1) to the server computers (S1–S5), with a header to call up the CPU load, the server computers (S1–S5) each send back a reply datagram (3.1–3.5; 6.1–6.5) over the computer network (1) to the user computer (U3) with the load-specific data value, the user computer (U3) analyzes the reply datagrams (3.1–3.5; 6.1–6,5) to determine which server computer (S1–S5) has the lowest CPU load, and access is initiated to the server computer (S1, S2) with the lowest CPU load, wherein the user computer (U3) seeking access sends a user identification parameter that is representative for this user computer (U3), specifically a user identification number (userID) and an associated domain name, to the server computers (S1–S5), and wherein the server computers (S1–S5) transmit datagrams (6.1–6.5) with additional information on the active or interrupted program sessions for the user computer (U3) seeking access to enable said user computer (U3) to reestablish interrupted program sessions on at least one (S4) of said server computers (S1–S5).

2. A method as set forth in claim 1, wherein the load-specific data value for the CPU load of a central processing unit of the respective server computer (S1–S5) is determined based on an amount of time that has elapsed since a last activation of the central processing unit.

3. A method as set forth in claim 2, wherein the load specific data value is determined from a defined number of entries of elapsed amounts of time into a table.

4. A method as set forth in claim 1, wherein the user computer (U3) seeking access sends a circular datagram (2, 5) to all server computers in the computer network (1).

5. A method as set forth in claim 1, wherein the user computer seeking access sends individual datagrams to pre-defined server computers.

6. A method as set forth in claim 1, wherein the server computers (S1–S5) transmit datagrams (3.1–3.5; 6.1–6.5) with information regarding connection ports that are available under defined data exchange protocols (RDP; ICA).

* * * * *